Patented Nov. 4, 1924.

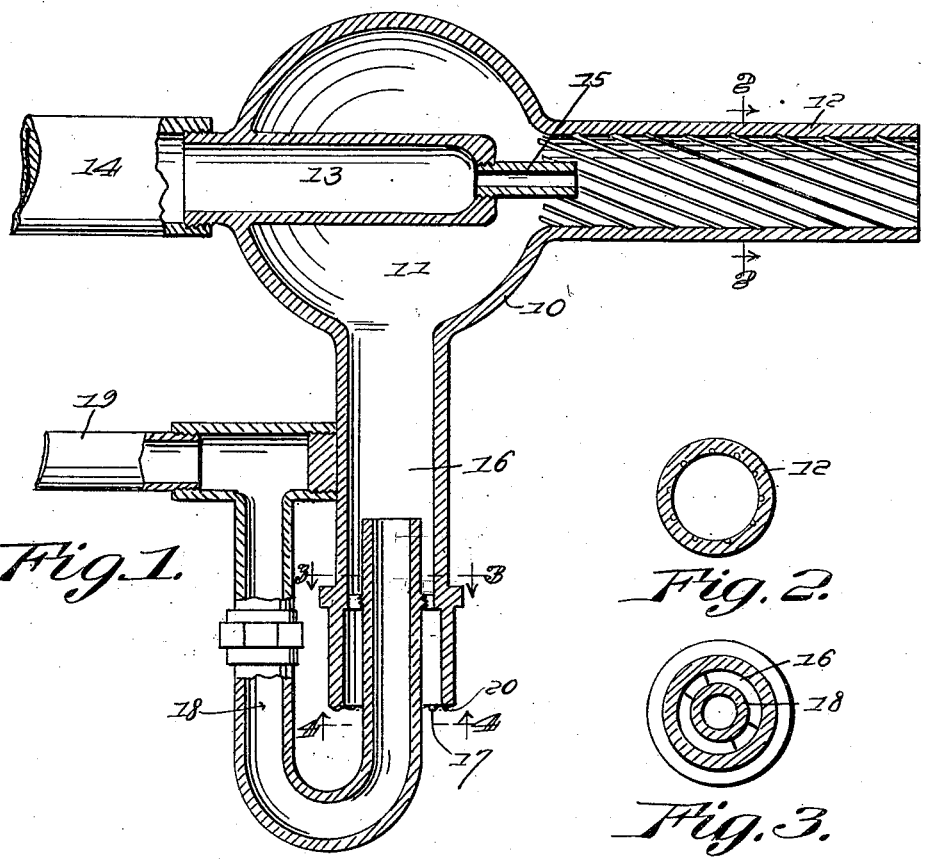

1,514,456

UNITED STATES PATENT OFFICE.

GEORGE LEWIS GOULD, OF PLAIN DEALING, LOUISIANA.

OIL BURNER.

Application filed February 10, 1922. Serial No. 535,537.

*To all whom it may concern:*

Be it known that GEORGE LEWIS GOULD, a citizen of the United States of America, residing at Plain Dealing, in the parish of Bossier and State of Louisiana, has invented new and useful Improvements in Oil Burners, of which the following is a specification.

The object of the invention is to provide a simple and efficient construction of burner adapted for use in the consumption of crude oil and adapted for effecting an economical use thereof; and with this object in view the invention consists in a construction and combination of parts of which a preferred embodiment is shown in the accompanying drawings, wherein:—

Figure 1 is a sectional view of a burner embodying the invention.

Figures 2, 3 and 4 are detail sectional views respectively on the lines 2—2, 3—3 and 4—4 of Figure 1.

The burner consists essentially of a globe 10 forming a mixing chamber 11 from which extends a burner tube 12 preferably interiorly rifled or spirally grooved as a means of securing a more effective mixture of the fuel and air; an injector 13 disposed diametrically in the mixing chamber in communication with a supply pipe 14 leading from any suitable or convenient source of steam or air under pressure, said injector having a reduced nozzle or nipple 15 which projects slightly into the inner end of the burner tube 12; a feed passage 16 formed by a tube extending radially from the globe 10 and open at its outer end for the admission of air as indicated at 17, and a fuel feed tube 18 of smaller diameter than the feed tube and extending into the open outer end of the latter and in alignment therewith, said fuel feed tube being in communication with a fuel supply pipe 19 leading from any suitable source (not shown) and adapted to supply the fuel either under pressure or by gravity.

A screen 20 is preferably used at the air inlet end of the feed passage 16 through which the air is inducted by the suction produced by the injector. Moreover as will be obvious the effect of the injector is to draw the fuel by suction through the feed tube 18 and cause an admixture thereof with the air introduced at the inlet 17 and the steam furnished by the injector to present the fuel in a highly combustible condition at the outlet of the burner tube.

It will be obvious that owing to the simplicity and compactness of the construction of the device it may be manufactured at a relatively small cost and maintained in operative condition without difficulty or likelihood of clogging and in the event that cleaning should be necessary the parts thereof can readily be disconnected and exposed throughout for that purpose.

Having described the invention, what is claimed as new and useful is:—

A crude oil burner having a globular mixing chamber provided with a radially extending burner tube and with a depending feed tube disposed substantially at right angles to the burner tube, an injection nozzle disposed within and in diametrical relation with the mixing chamber and in axial alignment with the burner tube, a fuel feed tube extending into the said feed tube and of reduced diameter as compared to the latter to provide an intervening space between it and the said feed tube, to provide an air inlet at the lower end of the feed tube and around the fuel feed tube, and a screen covering the open lower end of the feed tube around the fuel feed tube.

In testimony whereof he affixes his signature.

GEORGE LEWIS GOULD.